(12) United States Patent
Singh et al.

(10) Patent No.: US 8,377,406 B1
(45) Date of Patent: Feb. 19, 2013

(54) SYNTHESIS OF BIS(FLUOROSULFONYL)IMIDE

(75) Inventors: Rajendra P. Singh, Broomfield, CO (US); Jerry Lynn Martin, Superior, CO (US); Joseph Carl Poshusta, Broomfield, CO (US)

(73) Assignee: Boulder Ionics Corporation, Arvada, CO (US)

( * ) Notice: Subject to any disclaimer, the term of this patent is extended or adjusted under 35 U.S.C. 154(b) by 0 days.

(21) Appl. No.: 13/598,570

(22) Filed: Aug. 29, 2012

(51) Int. Cl.
*C07C 303/00* (2006.01)

(52) U.S. Cl. .................... 423/365; 423/386; 423/415.1; 423/491; 423/617; 564/83; 568/35

(58) Field of Classification Search .................. 423/365, 423/386, 491, 617, 415.1; 564/83; 568/28–37
See application file for complete search history.

(56) References Cited

U.S. PATENT DOCUMENTS

| | | | |
|---|---|---|---|
| 5,256,821 | A | 10/1993 | Armand |
| 5,874,616 | A | 2/1999 | Howells et al. |
| 6,235,921 | B1 | 5/2001 | Kobayashi et al. |
| 6,350,545 | B2 | 2/2002 | Fanta et al. |
| 7,253,317 | B2 | 8/2007 | Cernik et al. |
| 7,605,271 | B2 | 10/2009 | Uchimura et al. |
| 7,741,518 | B2 | 6/2010 | Yatsuyanagi et al. |
| 8,026,391 | B2 | 9/2011 | Uotani et al. |
| 8,134,027 | B2 | 3/2012 | Okumura et al. |
| 2005/0240052 | A1 | 10/2005 | Komata et al. |
| 2007/0043231 | A1 | 2/2007 | Hammami et al. |
| 2009/0118543 | A1 | 5/2009 | Yatsuyanagi et al. |
| 2009/0143613 | A1 | 6/2009 | Uotani et al. |
| 2010/0022803 | A1 | 1/2010 | Nanmyo et al. |
| 2010/0044617 | A1 | 2/2010 | Nishida et al. |
| 2010/0305345 | A1 | 12/2010 | Kurumaya et al. |
| 2011/0034716 | A1* | 2/2011 | Okumura et al. .............. 556/69 |
| 2011/0178306 | A1 | 7/2011 | Michot |
| 2011/0269990 | A1 | 11/2011 | Honda et al. |
| 2012/0009113 | A1 | 1/2012 | Honda et al. |
| 2012/0014859 | A1 | 1/2012 | Honda et al. |
| 2012/0020867 | A1 | 1/2012 | Morinaka et al. |
| 2012/0022269 | A1 | 1/2012 | Honda et al. |
| 2012/0041233 | A1 | 2/2012 | Sato et al. |
| 2012/0070358 | A1 | 3/2012 | Morinaka et al. |
| 2012/0184763 | A1 | 7/2012 | Kurumaya et al. |
| 2012/0193587 | A1 | 8/2012 | Sakuraba et al. |

FOREIGN PATENT DOCUMENTS

| | | |
|---|---|---|
| WO | 2009/123328 | * 10/2009 |
| WO | WO 2010/010613 | 1/2010 |
| WO | WO 2011/065502 | 6/2011 |
| WO | WO 2012/026360 | 3/2012 |

OTHER PUBLICATIONS

Adam, B.D. et al., "Cost comparison of Methyl Bromide and Sulfuryl Fluoride (ProFume®) for fumigating food processing facilities, warehouses, and cocoa beans," 10th International Working Conference on Stored Product Protection, Julius-Kühn-Archiv, 2010, vol. 425, pp. 314-321.

Technical Bulletin by Dow AgroSciences on Sulfuryl Fluoride gas fumigant, 2012.

Beran, M. et al. "A new route to the syntheses of alkali metal bis(fluorosulfuryl)imides: Crystal structure of LiN(SO2F) 2," Polyhedron, 2006, vol. 25, 1292-1298.

Kubota, K. et al., "Binary and ternary mixtures of MFSA (M=Li, K, Cs) as new inorganic ionic liquids," ECS Transactions, 2009, vol. 16(24), pp. 91-98.

Xu, K. et al., "Effect of N-substituents on protonation chemistry of trichlorophosphazenes," Inorg. Chim. Acta, 2000, vol. 298, pp. 16-23.

Han, H.-B., et al., "Lithium bis(fluorosulfonyl)imide (LiFSI) as conducting salt for nonaqueous liquid electrolytes for lithium-ion batteries: Physicochemical and electrochemical properties," J. Power Sources, 2011, vol. 196, pp. 3623-3632.

Zatloukalova, J. "Deregulation of Cell Proliferation and Apoptosis by Xenobiotics and Cytostatics", Masarykova Univerzita V Brne, Ph.D. Thesis, 2008.

* cited by examiner

*Primary Examiner* — Steven Bos
(74) *Attorney, Agent, or Firm* — Don D. Cha; Hamilton DeSanctis & Cha, LLP

(57) ABSTRACT

The present invention provides methods for producing bis (fluorosulfonyl) compounds of the formula:

$$F-S(O)_2-Z-S(O)_2-F \qquad I$$

by contacting a nonfluorohalide compound of the formula:

$$X-S(O)_2-Z-S(O)_2-X$$

with bismuth trifluoride under conditions sufficient to produce the bis(fluorosulfonyl) compound of Formula I, where Z and X are those defined herein.

19 Claims, No Drawings

SYNTHESIS OF BIS(FLUOROSULFONYL)IMIDE

FIELD OF THE INVENTION

The present invention relates to a method for producing bis(fluorosulfonyl) compounds of the formula F—S(O)$_2$—Z—S(O)$_2$—F from a nonfluorohalide compound of the formula X—S(O)$_2$—Z—S(O)$_2$—X using bismuth trifluoride. These compounds are useful in various applications including as electrolytes in electrochemical devices such as batteries and capacitors.

BACKGROUND OF THE INVENTION

Fluorine has the highest electronegativity in the periodic table. As such, incorporation of fluorine into molecules often results in a significant change in the physical and chemical properties of molecules. Some fluorine-containing compounds have high electrochemical stability and are useful in electrochemical energy storage devices such as batteries and electric double layer capacitors (EDLCs). For example, fluorinated salts such as lithium bis(trifluoromethylsulfonyl) imide (Li TFSI) have been used as components of electrolytes for batteries and EDLCs. These salts have advantageous properties, including high thermal stability, and wide electrochemical stability windows, but these salts can cause corrosion of cell components. U.S. Pat. No. 5,916,475 discloses lithium bis(fluorosulfonyl)imide salts as having advantages over other electrolyte salts such as Li TFSI and Li PF$_6$, including better temperature stability, higher conductivity, and lower corrosion rates. Due at least in part to these advantages there has been extensive research activity in synthesis, structural and electrochemical aspects of various fluorine containing compounds including bis(fluorosulfonyl)imide (HFSI), its metal salts and ionic liquids comprising such compounds.

Bis(fluorosulfonyl)imides and ionic liquids comprising the same have been shown to be useful as electrolytes in lithium ion batteries and ultracapacitors. Bis(fluorosulfonyl)imide is a relatively strong acid and forms various stable metal salts. These compounds are useful as electrolytes and the lithium salt of bis(fluorosulfonyl)imide (i.e., LiFSI) is particularly useful in batteries and ultracapacitors.

Lithium ion batteries are particularly attractive as a secondary battery due to their high energy density and high power density. Batteries with electrolytes comprising ionic liquids of bis(fluorosulfonyl)imide and/or its metal salt have shown to be safer, more reliable, and possess higher energy density relative to many conventional lithium ion batteries.

Ambient temperature ionic liquids are useful and safe electrolytes due to their non-volatility, non-flammability, wide electrochemical stability window and high ionic conductivity. Among various ionic liquids, bis(fluorosulfonyl)imide-based ionic liquids typically show a significantly lower viscosity, lower melting point and higher ionic conductivity than other ionic liquids. Some studies have also shown that a mixture of two different alkali metal salts of FSI (resulting in a eutectic mixture) has novel electrochemical properties. The eutectic point for LiFSI-KFSI is 338 K and that for NaFSI-KFSI is 330 K. The electrochemical window of LiFSI-KFSI eutectic melt is 6.0 V at 348 K and that of NaFSI-KFSI eutectic melt is 5.0 V at 340 K. These new inorganic ionic liquids are promising electrolytes for various high-temperature electrochemical applications.

Despite the advantages of compounds containing the bis (fluorosulfonyl)imide ion, no commercial production exists more than 45 years after its first synthesis, and nearly twenty years after its identification as a promising material for electrochemical applications. This is due at least in part to the cost and difficulty of synthesizing high-purity salts of the FSI anion. While many processes for producing HFSI are known, each of the known methods for synthesizing HFSI has disadvantages or short comings. For example, one method for synthesizing HFSI uses urea (NH$_2$CONH$_2$) and fluorosulfonic acid (FSO$_3$H). One of the major disadvantages for this process is the toxicity and corrosive nature of FSO$_3$H. Moreover, it is difficult to control this reaction due to local overheating during the addition of fluorosulfonic acid to the reaction mixture. This difficulty in controlling the reaction results in an unpredictable yield of the desired product. See, for example, *Chem. Ber.*, 1962, 95, 246-248 (61% yield) and L. Zatloukalova, Thesis, UJEP Brno, 1979 (14.5% yield).

Another method for synthesizing HFSI involves fluorinating bis(chlorosulfonyl)-imide (i.e., HCSI) with arsenic trifluoride (AsF$_3$). In this reaction, HCSI is treated with AsF$_3$. Arsenic trifluoride is toxic and because it has a high vapor pressure, it is particularly difficult to handle on an industrial scale. A typical reaction uses 1:8.6 ratio of HCSI to AsF$_3$. This means a large excess of highly dangerous arsenic trifluoride is used.

HFSI can also be prepared by the fluorination of HCSI with antimony trifluoride (SbF$_3$). The antimony trichloride byproduct of this reaction has both high solubility in HFSI and a very similar boiling point, making it very difficult to separate from the desired product. The product of this reaction is also typically contaminated with chloride, which renders the product unsuitable for electrochemical applications.

Yet another method for producing HFSI involves reacting HCSI with excess anhydrous HF at high temperature. See, for example, U.S. Pat. No. 7,919,629. The yield of this reaction is at most 60%, with the product contaminated with fluorosulfonic acid that is produced from the decomposition of HCSI. This by-product is difficult to remove on an industrial scale as the boiling point is close to that of HFSI.

Synthesis of lithium and sodium salts of HFSI has been reported. See, for example, *Electrochemical Society Transactions*, 2009, 24, pp. 91-98; and *Polyhedron*, 2006, 25, pp. 1292-1298. In particular, lithium salt of HFSI was synthesized by the metathesis reaction of potassium salt of HFSI (i.e., KFSI) with lithium perchlorate (LiClO$_4$). This reaction also produces potassium perchlorate (KClO$_4$), which is an explosive compound. HFSI has also been synthesized from KFSI using perchloric acid. This reaction also produces KClO$_4$. These processes are not suitable for commercial scale synthesis due to explosive nature of perchloric acid, lithium perchlorate, and potassium perchlorate.

U.S. Pat. No. 7,253,317 describes the synthesis of HFSI from bis(chlorosulfonyl)imide or HCSI, using potassium fluoride (KF) and other monovalent fluorides. This process is relatively slow (22 hours), typically requires volatile organic solvents (nitromethane) and yields a product with too high of potassium content for use in batteries. In addition, the reaction can form dangerous nitrous vapors in the reactor.

U.S. Pat. No. 7,919,629 describes the difficulty of synthesizing HFSI, stating in part "It thus appears that the use of bis(fluorosulfonyl)imide is particularly complex to implement. Despite intensive efforts for nearly ten years in collaboration with renowned academic and industrial experts in fluorine chemistry, production on an industrial scale of bis (fluorosulfonyl)imides could not be implemented."

Accordingly, there is a need for a relatively safer and/or less costly method for producing high purity bis(fluorosulfonyl)imide compounds and derivatives thereof.

SUMMARY OF THE INVENTION

Some aspects of the invention provide methods for producing a fluorinated compound of the formula:

$$F-S(O)_2-Z-S(O)_2-F \qquad I$$

by contacting a nonfluorohalide compound of the formula:

$$X-S(O)_2-Z-S(O)_2-X \qquad II$$

with bismuth trifluoride ($BiF_3$) under conditions sufficient to produce said fluorinated compound of Formula I. Typically, such methods also produce $BiX_3$ as a byproduct. In some embodiments, the invention also provides methods of regenerating $BiF_3$ from the $BiX_3$ with lower-cost sources of fluorine. This recycling of $BiX_3$ results in overall cost-effective production of bis(fluorosulfonyl)imide on an industrial scale. In compounds of Formulas I and II, each X is independently a halide, provided that at least one X is a nonfluoro halide; Z is $NR^1$ or $CR^2R^3$; $R^1$ is H, halide, optionally substituted alkyl, optionally substituted alkenyl, optionally substituted alkynyl, haloalkyl, haloalkenyl, haloalkynyl, a nitrogen protecting group, an alkali metal, an alkaline earth metal, a transition metal, a lanthanide, or an actinide; and each of $R^2$ and $R^3$ is independently H, halide, optionally substituted alkyl, optionally substituted alkenyl, optionally substituted alkynyl, haloalkyl, haloalkenyl, or haloalkynyl. In some embodiments, $R^2$ and $R^3$ together with the carbon atom which they are attached to form a cycloalkyl, cycloalkenyl, halocycloalkyl, or halocycloalkenyl, each of which is optionally substituted.

DETAILED DESCRIPTION OF THE INVENTION

Definitions

"Alkyl" refers to a saturated linear monovalent hydrocarbon moiety of one to twelve, typically one to six, carbon atoms or a saturated branched monovalent hydrocarbon moiety of three to twelve, typically three to six, carbon atoms. Alkyl groups can optionally be substituted with an alkoxide (i.e., $-OR^a$, where $R^a$ is alkyl) and/or other functional group(s) that are either protected or non-reactive under a given reaction condition. Exemplary alkyl groups include, but are not limited to, methyl, ethyl, n-propyl, 2-propyl, tert-butyl, pentyl, and the like.

"Alkenyl" means a linear monovalent hydrocarbon moiety of two to twelve, typically two to six carbon atoms or a branched monovalent hydrocarbon moiety of three to twelve, typically three to six carbon atoms, containing at least one carbon-carbon double bond. Alkenyl groups can optionally be substituted with one or more functional groups that are either protected or non-reactive under a given reaction condition. Exemplary alkenyl groups include, but are not limited to, ethenyl, propenyl, butenyl, and the like.

"Alkynyl" means a linear monovalent hydrocarbon moiety of two to twelve, typically two to six carbon atoms or a branched monovalent hydrocarbon moiety of three to twelve, typically three to six carbon atoms, containing at least one carbon-carbon triple bond. Alkynyl groups can optionally be substituted with one or more functional groups that are either protected or non-reactive under a given reaction condition. Exemplary alkynyl groups include, but are not limited to, ethynyl, propynyl, butynyl, and the like.

"Cycloalkyl" refers to a non-aromatic, saturated, monovalent mono- or bicyclic hydrocarbon moiety of three to ten ring carbons. The cycloalkyl can be optionally substituted with one or more, for example, one, two or three, substituents within the ring structure that are either protected or unreactive under a given reaction condition.

"Cycloalkenyl" refers to a non-aromatic, monovalent mono- or bicyclic hydrocarbon moiety of three to ten ring carbons having at least one carbon-carbon double bond within the ring system. The cycloalkyl can be optionally substituted with one or more, for example, one, two or three, substituents within the ring structure that are either protected or unreactive under a given reaction condition.

The terms "halo," "halogen" and "halide" are used interchangeably herein and refer to fluoro, chloro, bromo, or iodo.

The terms "nonfluorohalide", "nonfluorohalo" and "nonfluorohalogen" are used interchangeable herein and refer to chloro, bromo, or iodo.

"Haloalkyl" refers to an alkyl group as defined herein in which one or more hydrogen atom is replaced by same or different halo atoms, including perhalogenated alkyl groups in which all alkyl hydrogen atoms are replaced by halogen atoms. Exemplary haloalkyl groups include, but are not limited to, $-CH_2Cl$, $-CF_3$, $-CH_2CF_3$, $-CH_2CCl_3$, and the like.

"Haloalkenyl" refers to an alkenyl group as defined herein in which one or more hydrogen atom is replaced by same or different halo atoms, including perhalogenated alkenyl groups in which all alkyl hydrogen atoms are replaced by halogen atoms.

"Haloalkynyl" refers to an alkynyl group as defined herein in which one or more hydrogen atom is replaced by same or different halo atoms, including perhalogenated alkynyl groups.

"Halocycloalkyl" refers to a cycloalkyl group as defined herein in which one or more hydrogen atom is replaced by same or different halo atoms, including perhalogenated cycloalkyl groups.

"Halocycloalkenyl" refers to a cycloalkenyl group as defined herein in which one or more hydrogen atom is replaced by same or different halo atoms, including perhalogenated cycloalkenyl groups.

As used herein, the term "optionally substituted" means the group is optionally substituted with one or more substituents that are nonreactive under a given reaction condition.

"Protecting group" refers to a moiety that when attached to a reactive group in a molecule masks, reduces or prevents that reactivity. Examples of protecting groups can be found in T. W. Greene and P. G. M. Wuts, *Protective Groups in Organic Synthesis*, 3$^{rd}$ edition, John Wiley & Sons, New York, 1999, and Harrison and Harrison et al., *Compendium of Synthetic Organic Methods*, Vols. 1-8 (John Wiley and Sons, 1971-1996), which are incorporated herein by reference in their entirety. Representative amino protecting groups include, formyl, acetyl, trifluoroacetyl, benzyl, benzyloxycarbonyl (CBZ), tert-butoxycarbonyl (Boc), trimethyl silyl (TMS), 2-trimethylsilyl-ethanesulfonyl (SES), trityl and substituted trityl groups, allyloxycarbonyl, 9-fluorenylmethyloxycarbonyl (FMOC), nitro-veratryloxycarbonyl (NVOC), and the like.

As used herein, the terms "treating", "contacting" and "reacting" refer to adding or mixing two or more reagents under appropriate conditions to produce the indicated and/or the desired product. It should be appreciated that the reaction which produces the indicated and/or the desired product may not necessarily result directly from the combination of two reagents which were initially added, i.e., there may be one or more intermediates which are produced in the mixture which ultimately leads to the formation of the indicated and/or the desired product.

Illustrative Methods of the Invention

Some aspects of the invention are directed toward overcoming one or more of the problems associated with producing bis(fluorosulfonyl)imide as discussed above. In some embodiments, methods of the invention use bismuth trifluoride as a fluorinating reagent. In some embodiments, methods of the invention allow used bismuth reagent to be recycled to regenerate bismuth trifluoride.

In one particular embodiment, the present invention provides a method for producing HFSI. In contrast to previous methods of producing FSI compounds, which typically yield solid salts, HFSI is a liquid at room temperature. Thus, HFSI can be further reacted with other solid compounds without requiring additional solvents. HFSI is particularly advantageous for producing metal salts of bis(fluorosulfonyl)imide, as these salts can be prepared in simple neutralization reactions with widely available metal carbonates, hydroxides or pure metals. In addition, using HFSI of high purity, some embodiments of the invention provide methods for producing ionic liquids comprising the FSI anion that are substantially free of metal and halide contamination.

One particular aspect of the invention provides a method for producing a fluorinated compound of the formula:

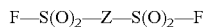

by contacting a nonfluorohalide compound of the formula:

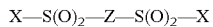

with bismuth trifluoride under conditions sufficient to produce said fluorinated compound of Formula I. Typically, such methods also produce $BiX_3$ as a byproduct. In compounds of Formulas I and II, each X is independently a halide, provided that at least one X is a nonfluoro halide; Z is NR' or $CR^2R^3$; $R^1$ is H, halide, optionally substituted alkyl, optionally substituted alkenyl, optionally substituted alkynyl, haloalkyl, haloalkenyl, haloalkynyl, a nitrogen protecting group, an alkali metal, an alkaline earth metal, a transition metal, a lanthanide, or an actinide; and each of $R^2$ and $R^3$ is independently H, halide, optionally substituted alkyl, optionally substituted alkenyl, optionally substituted alkynyl, haloalkyl, haloalkenyl, or haloalkynyl. In some embodiments, $R^2$ and $R^3$ together with the carbon atom which they are attached to form a cycloalkyl, cycloalkenyl, halocycloalkyl, or halocycloalkenyl, each of which is optionally substituted.

In some embodiments, $R^1$ is H, F, alkyl (e.g., $C_nH_{2n+1}$, n=1-12), unsaturated alkyl (e.g., alkenyl: $C_nH_{2n}$, n=1-12; alkynyl: $C_nH_{2n-2}$, n=12), fully fluorinated or partially fluorinated alkyl groups, fully fluorinated or partially fluorinated unsaturated alkyl group, a nitrogen protecting group, or alkali metal, alkaline earth metal, transition metal, a lanthanide, or an actinide. In some instances, $R^1$ is H or a nitrogen protecting group. Typically, $R^1$ is H.

In other embodiments, each of $R^2$ and $R^3$ is independently H, F alkyl ($C_nH_{2n+1}$, n=1-12), unsaturated alkyl (e.g. alkenyl: $C_nH_{2n}$, n=1-12; alkynyl: $C_nH_{2n-2}$, n=12), fully fluorinated or partially fluorinated alkyl groups, fully fluorinated or partially fluorinated unsaturated alkyl group.

Methods of the invention can also include contacting $BiX_3$ that is produced in the reaction described above with an oxygenating agent under conditions sufficient to produce $Bi_2O_3$. Exemplary oxygenating agents for converting $BiX_3$ to $Bi_2O_3$ include, but are not limited to, a metal carbonate, a hydroxide compound (e.g., alcohols), water, oxygen, ozone, hydrogen peroxide, nitrous oxide, osmium tetraoxide, or a combination thereof. In one particular embodiment, a metal carbonate such as lithium carbonate, sodium carbonate, cesium carbonate, magnesium carbonate or calcium carbonate is used as the oxygenating agent. Typically, the $Bi_2O_3$ is then reacted with a fluorinating agent to regenerate $BiF_3$. Regenerated $BiF_3$ can be recycled and reused. Accordingly, unlike some conventional methods that generate toxic heavy metal (e.g., arsenic) waste, methods of the invention do not require use of a toxic or a large quantity of metal. Exemplary fluorinating agents that are useful in producing $BiF_3$ from $Bi_2O_3$ include, but are not limited to, aqueous or anhydrous hydrofluoric acid, fluorine, or a metal fluoride of the formula M'F, where M' is an alkali metal, alkaline earth metal, or a transition metal.

In another embodiment of the invention, $Bi_2O_3$ can be converted to $BiF_3$ using nitric acid and a metal fluoride such as potassium fluoride. For example, reacting $Bi_2O_3$ with concentrated nitric acid generates bismuth nitrate which can be reacted with potassium fluoride in situ to produce $BiF_3$.

In some embodiments, Z is $NR^1$. Within these embodiments, often $R^1$ is H.

Methods of the invention also can be used to produce a metal salt of the fluorinated compound of Formula I. For example, reacting compound of Formula I with a carbonate compound of the formula $M[CO_3]_m$ produces a metal salt of the fluorinated compound of Formula I. Typically, M is an alkali metal, an alkaline earth metal, a transition metal, a lanthanide, or an actinide, and m is the oxidation state of M. Often methods of the invention are used to produce a lithium, sodium, potassium, cesium, or magnesium salt of compound of Formula I, or a mixture thereof.

Generally, the metal salt of the fluorinated compound of Formula I produced by methods of the invention is substantially halide free. As used herein, the term "substantially halide free" means the purity of the metal salt of fluorinated compound of Formula I is such that the amount of non-fluorine halide present is about 100 ppm or less, typically about 50 ppm or less, and often 5 ppm or less. Low halide content is desirable for use in many electrochemical applications. It has been shown that chlorine contents of more than 50 ppm make lithium salts of FSI unsuitable for use in lithium ion batteries. See, for example, H.-B. Han, S.-S. Zhou, D.-J. Zhang, S.-W. Feng, L.-F. Li, K. Liu, W.-F. Feng, J. Nie, H. Li, and X.-J. Huang, "Lithium bis(fluorosulfonyl)imide (LiFSI) as conducting salt for nonaqueous liquid electrolytes for lithium-ion batteries: Physicochemical and electrochemical properties," Journal of Power Sources, vol. 196, no. 7, pp. 3623-3632, 2011.

Methods of the invention can be used to produce salts with melting points below 100° C., i.e. ionic liquids. Ionic liquids with the FSI anion are known. See, for example, U.S. Pat. No. 6,365,301. Ionic liquids comprising the FSI anion can be produced by metathesis reactions with other salts and ionic liquids using methods known to those skilled in the art. For example, ethylmethylimidozolium bis(fluorosulfonyl)imide (i.e., EMIM-FSI) can be produced by mixing ethylmethylimidozolium chloride (EMIM Cl) with HFSI in the presence of water. The product, EMIM FSI is insoluble in water and forms a biphasic mixture, from which the hydrophobic ionic liquid, EMIM FSI, can be easily separated. Alternately, the metathesis reaction can be conducted with a metal salt of FSI. For example, conducting the metathesis reaction with KFSI and EMIM Cl in the presence of a suitable solvent such as water leads to the formation of EMIM FSI and phase separation into an organic and an aqueous phase. Other suitable methods for producing ionic liquids comprising FSI are well known to those skilled in the art.

Another aspects of the invention provide a method for producing a fluorinated compound of the formula: F—S(O)$_2$—Z—S(O)$_2$—F from a nonfluorohalide compound of the formula: X—S(O)$_2$—Z—S(O)$_2$—X, where each X is independently a halide, provided at least one of X is a non-fluoro halide;

Z is NR$^1$ or CR$^2$R$^3$;

R$^1$ is H, alkyl, or a nitrogen protecting group; and each of R$^2$ and R$^3$ is independently H, halide, alkyl, or haloalkyl.

Such methods typically comprise contacting said nonfluorohalide compound with BiF$_3$ under conditions sufficient to produce said fluorinated compound and BiX$_3$ as a byproduct. BiX$_3$ byproduct can be recycled to regenerate BiF$_3$ as described above.

Still further, combinations of the various groups described herein form other embodiments. For example, in one particularly embodiment Z is NR$^1$, R$^1$ is H, alkyl, or a nitrogen protecting group, and X is Cl. In this manner, a variety of methods are embodied within the present invention.

One particular starting material, e.g., bis(chlorosulfonyl)imide (i.e., HCSI) can be synthesized by the reaction of sulfamic acid with phosphorous pentachloride in 80-88% yields following the procedures described in *Chem. Ber.*, 1962, 95, pp. 625-626; or *Inorg. Chim. Acta*, 2000, 298, pp. 16-23. Use of these synthetic routes is not desirable due to difficulties in separating HCSI from phosphorous oxytrichloride (POCl$_3$) which is formed as one of the byproducts of the reaction. It has also been reported that HCSI can be produced directly by the reaction of urea with chlorosulfonic acid but the reported yield is only 4%.

One particularly useful method for the synthesis of HCSI is the reaction of thionyl chloride with sulfamic acid and chlorosulfonic acid as described in *Z. Anorg. Allg. Chem.*, 2005, 631, pp. 55-59. Often yield of the product (i.e., HCSI) in this reaction is almost quantitative.

Recently, it was reported that tris[di(fluorosulfonyl)imide] bismuth salt was produced by reacting HCSI with BiF$_3$. See U.S. Pat. No. 8,314,027. Surprisingly and unexpectedly, under reaction conditions disclosed herein, the present inventors have found that reaction of HCSI with BiF$_3$ can be used to produce HFSI rather than tris[di(fluorosulfonyl)imide]bismuth salt as disclosed in U.S. Pat. No. 8,314,027.

One of the advantages of methods of the invention is regeneration of bismuth(III) oxide, (Bi$_2$O$_3$) from bismuth trichloride that is formed in the reaction. Typically, bismuth trichloride was converted to bismuth(III) oxide by treating with sodium carbonate in water. Generally, bismuth trichloride was placed in a beaker and treated with aqueous sodium carbonate and heated to 90° C. for 10 minutes. Water insoluble bismuth(III) oxide was obtained by filtration and washed with water to remove sodium chloride. The isolated bismuth(III) oxide was dried in air.

Bismuth(III) oxide was then reacted with either anhydrous HF or aqueous HF to regenerate bismuth trifluoride. Typically, bismuth(III) oxide was placed in a PTFE vessel and treated with excess aq. HF until all the solids dissolved. After stirring for 0.5 h, it was carefully concentrated at reduced pressure to remove water and excess HF. The desired product, BiF$_3$, was vacuum dried and stored under argon atmosphere.

HFSI synthesized using methods disclosed herein was converted to a variety of metal salts. For example, HFSI was treated with lithium, sodium or potassium carbonate in water at room temperature. The salt formed in the reaction was extracted with ethyl acetate and concentrated at reduced pressure. The isolated salts were vacuum dried at 50° C. overnight to produce the corresponding metal salts of FSI.

Lithium and sodium salts of FSI can also be synthesized by the metathesis reaction of KFSI with a corresponding boron tetrafluoride (e.g., LiBF$_4$ and NaBF$_4$). In particular, the present inventors have found that reaction of KFSI with NaBF$_4$ in water and acetonitrile mixture resulted in production of NaFSI in excellent yield. NaBF$_4$ is soluble in water while KBF$_4$ have a very poor solubility in water. Thus, NaBF$_4$ was dissolved in minimum amount of water and mixed with acetonitrile. This solution was then added to an acetonitrile solution of KFSI at room temperature. The precipitated KBF$_4$ was removed by filtration, and the filtrate was concentrated to dryness. The residue was then mixed with dimethyl carbonate to precipitate out any KBF$_4$ or excess NaBF$_4$. The resulting solution mixture was filtered, and the filtrate was concentrated at reduced pressure to leave produce NaFSI as a white powder.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Unless otherwise stated, all the chemicals used were of reagents grades. Potassium fluoride, antimony trifluoride, and bismuth trifluoride used were anhydrous. Hydrogen fluoride reactions were performed either in a PTFE coated reaction vessel or a stainless steel reaction vessel.

Example 1

Synthesis of bis(chlorosulfonyl)imide (HCSI)

To a three neck round bottom flask, equipped with mechanical stirring, a condenser, and a thermometer, was added a mixture of sulfamic acid (4.2 mol, 407.8.5 g), chlorosulfonic acid (4.2 mol, 489.3 g, 333 ml), and thionyl chloride (11.50 mol, 1369.2 g, 835 ml) under argon atmosphere. The reaction mixture was heated to 130° C. for 24 h. The liberated hydrogen chloride and sulfur dioxide were scrubbed by bubbling in a 2.56 molar caustic soda solution. Excess thionyl chloride was recovered by distillation at ambient pressure. Bis(chlorosulfonyl)imide was distilled at reduced pressure as a light yellow liquid which solidified on standing at room temperature. Yield: 880 g (98%), B.P. 101-103° C./1 mmHg.

Example 2

Synthesis of bis(fluorosulfonyl)imide (HFSI)

In a 100 ml PTFE coated flask containing bis(chlorosulfonyl)imide (0.56 mol, 120 g), bismuth trifluoride (0.37 mol, 99.42 g) was added under argon atmosphere at room temperature with vigorous stirring. The mixture was cooled with tap water and then slowly warmed to room temperature. It was stirred at room temperature. for 12 h then transferred to a glass flask and distilled at reduced pressure to yield HFSI as a colorless liquid. Yield: 91.35 g (90%); B.P. 68-69° C./25 mmHg.

Example 3

Conversion of Bismuth Trichloride to Bismuth(III) Oxide (Bi$_2$O$_3$)

Bismuth trichloride (0.35 mol, 110.36 g) was taken in a beaker and hydrolyzed with sodium carbonate (0.25 mol, 44.5 g) in water (200 ml) and heated to 90° C. for 30 minutes. Bismuth(III) oxide was formed as water insoluble solid. The reaction mixture was filtered, washed with water and dried in air to yield bismuth(III) oxide as an off-white solid. Yield: 80 g (95%).

Example 4

Synthesis of Bismuth Trifluoride from Bismuth Oxide

Bismuth(III) oxide (0.17 mol, 80 g) was placed in a PTFE coated flask. Aqueous hydrogen fluoride (2 mol, 84.0 g of 48-50% solution in water) was added slowly. The reaction mixture was stirred at room temperature for 1 h and filtered. The obtained solid was transferred to a PTFE coated flask and dried in vacuo. Yield: 89.4 g (98%).

Example 5

Synthesis of bis(fluorosulfonyl)imide Using Recovered Bismuth Trifluoride

In a 100 ml PTFE coated flask containing bis(chlorosulfonyl)imide (0.3 mol, 64.2 g), was added bismuth trifluoride (obtained from example 4) (0.2 mol, 53.18 g) at room temperature with vigorous stirring. The reaction mixture was cooled by immersing the flask in a bath of cold water, and then slowly warmed to room temperature. The resulting mixture was stirred at room temperature for 12 h. The reaction mixture was then transferred to a glass flask and distilled at reduced pressure to produce HFSI as a colorless liquid. Yield: 48.3 g (89%); B.P. 68-69° C./25 mmHg.

Example 6

Synthesis of Lithium bis(fluorosulfonyl)imide (LiFSI)

Bis(fluorosulfonyl)imide, HFSI, (27.15 g, 0.15 mol) was placed in a beaker and cooled to −78° C. Water (10 ml) was added, and the mixture was warmed to room temperature A suspension of lithium carbonate (5.53 g) was added slowly until the pH level reached about pH 7. Insoluble material was removed by filtration, and the water phase was diluted with 100 ml of ethyl acetate. The organic layer was separated and concentrated. The resulting residue was heated to 50° C. under vacuum overnight. The product LiFSI was obtained as a white solid. Yield: 28.05 g, 92%.

Example 7

Synthesis of Sodium bis(fluorosulfonyl)imide (NaFSI)

The procedure of Example 6 was followed except sodium carbonate was used instead of lithium carbonate to obtain NaFSI as a white solid. Yield: 18.2 g, 90%.

Example 8

Synthesis of potassium bis(fluorosulfonyl)imide (KFSI)

The procedure of Example 6 was followed except potassium carbonate was used instead of lithium carbonate to obtain KFSI as a white solid. Yield: 19.8 g, 90.5%.

Example 9

Synthesis of sodium bis(fluorosulfonyl)imide (NaFSI)

Potassium bis(fluorosulfonyl)imide, KFSI, (21.9 g, 0.1 mol) was placed in a beaker and dissolved in acetonitrile (15 ml). In a separate beaker, sodium tetrafluoroborate (12 g, 0.11 mol) was dissolved in a mixture of water (20 ml) and acetonitrile (20 ml). The $NaBF_4$ solution was added to KFSI solution with stirring at room temperature. The resulting mixture was stirred for 0.5 h and precipitated $KBF_4$ was removed by filtration. The solid was washed with acetonitrile (10 ml). The combine filtrates was concentrated at reduced pressure yielding a solid. To this solid was added anhydrous dimethyl carbonate (30 ml), and the resulting mixture was filtered to remove any insoluble $NaBF_4$ or $KBF_4$. The filtrate was concentrated to dryness to afford NaFSI as white solid. Yield: 18.0 g, 90%.

Example 10

Synthesis of $BiF_3$ from $Bi_2O_3$

Bismuth oxide was slowly dissolved in minimum amount of concentrated nitric acid (70%). To this mixture was added an aqueous solution of potassium fluoride dissolved in dilute nitric acid. The precipitated bismuth trifluoride was washed with room temperature water followed by hot water. The salt was dried at 100° C. under vacuum to produce $BiF_3$.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for producing a fluorinated compound of the formula: F—S(O)$_2$—Z—S(O)$_2$—F from a nonfluorohalide compound of the formula: X—S(O)$_2$—Z—S(O)$_2$—X, said method comprising contacting said nonfluorohalide compound with $BiF_3$ under conditions sufficient to produce said fluorinated compound and $BiX_3$ as a byproduct, wherein each X is independently a halide, provided at least one of X is a non-fluoro halide;

Z is $NR^1$ or $CR^2R^3$;

$R^1$ is H, alkali metal, alkyl, or a nitrogen protecting group; and each of $R^2$ and $R^3$ is independently H, halide, alkyl, or haloalkyl.

2. The method of claim 1 further comprising the step of contacting $BiX_3$ with an oxygenating agent under conditions sufficient to produce $Bi_2O_3$.

3. The method of claim 2, wherein said oxygenating agent comprises a metal carbonate, a hydroxide compound, water, oxygen, ozone, hydrogen peroxide, nitrous oxide, osmium tetraoxide, or a combination thereof.

4. The method of claim 3 further comprising the step of contacting $Bi_2O_3$ with a fluorinating agent under conditions sufficient to produce $BiF_3$.

5. The method of claim 4, wherein $BiF_3$ used in producing said fluorinated compound comprises $BiF_3$ produced from $Bi_2O_3$.

6. The method of claim 5, wherein said fluorinating agent comprises aqueous or anhydrous hydrofluoric acid, fluorine, or M'F, wherein M' is alkali metal, alkaline earth metal, or a transition metal.

7. The method of claim 1, wherein Z is $NR^1$.

8. The method of claim 7, wherein $R^1$ is H.

9. The method of claim 8 further comprising the steps of producing a metal salt of said fluorinated compound, said steps comprising contacting said fluorinated compound with a carbonate compound of the formula $M[CO_3]_m$ under conditions sufficient to produce said metal salt of said fluorinated compound, wherein M is an alkali metal, an alkaline earth metal, a transition metal, a lanthanide, or an actinide, and m is the oxidation state of M.

10. The method of claim 9, wherein said metal salt of said fluorinated compound comprises a lithium salt, sodium salt, potassium salt, cesium salt, magnesium salt, or a mixture thereof.

11. The method of claim 9, wherein said metal salt of said fluorinated compound is substantially halide free.

12. A method for producing a bis(fluorosulfonyl)imide of the formula:

$$F-S(O)_2-NR^1-S(O)_2-F$$

said method comprising contacting a bis(nonfluorohalosulfonyl)imide of the formula:

$$X-S(O)_2-NR^1-S(O)_2-X$$

with $BiF_3$ under conditions sufficient to produce said bis(fluorohalosulfonyl)imide, wherein
each X is independently a halide provided at least one of X is a non-fluoro halide; and
$R^1$ is H, alkali metal, alkyl, or a nitrogen protecting group.

13. The method of claim 12, wherein X is chloro and $R^1$ is H.

14. The method of claim 12, wherein said method produces $BiX_3$, and wherein said method further comprises the step of contacting $BiX_3$ with an oxygenating agent under conditions sufficient to produce $Bi_2O_3$, wherein said oxygenating agent comprises a metal carbonate, a hydroxide compound, water, oxygen, ozone, hydrogen peroxide, nitrous oxide, osmium tetraoxide, or a combination thereof.

15. The method of claim 14 further comprising the step of contacting $Bi_2O_3$ with a fluorinating agent under conditions sufficient to produce $BiF_3$.

16. The method of claim 15, wherein $BiF_3$ used in producing said bis(fluorohalosulfonyl)imide comprises $BiF_3$ produced from $Bi_2O_3$.

17. The method of claim 12, wherein $R^1$ is H, and said method further comprises contacting said bis(fluorosulfonyl)imide with a carbonate compound of the formula $M[CO_3]_m$ under conditions sufficient to produce a metal salt of bis(fluorosulfonyl)imide of the formula:

$$F-S(O)_2-N(M)-S(O)_2-F$$

wherein
M is an alkali metal, an alkaline earth metal, a transition metal, a lanthanide, or an actinide; and
m is the oxidation state of M.

18. The method of claim 17, wherein M comprises lithium, sodium, potassium, cesium, or magnesium.

19. The method of claim 17, wherein said metal salt of bis(fluorosulfonyl)imide is substantially halide free.

* * * * *